US009957913B2

United States Patent
Ono (10) Patent No.: US 9,957,913 B2
(45) Date of Patent: May 1, 2018

(54) CONTROL DEVICE FOR COMPRESSION-IGNITED INTERNAL COMBUSTION ENGINE

(71) Applicant: TOYOTA JIDOSHA KABUSHIKI KAISHA, Toyota-shi, Aichi-ken (JP)

(72) Inventor: Tomoyuki Ono, Shizuoka-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days. days.

(21) Appl. No.: 15/112,545

(22) PCT Filed: Jan. 19, 2015

(86) PCT No.: PCT/IB2015/000042
§ 371 (c)(1),
(2) Date: Jul. 19, 2016

(87) PCT Pub. No.: WO2015/110894
PCT Pub. Date: Jul. 30, 2015

(65) Prior Publication Data
US 2016/0333819 A1    Nov. 17, 2016

(30) Foreign Application Priority Data

Jan. 21, 2014   (JP) ................................. 2014-009026

(51) Int. Cl.
*F02D 41/22*    (2006.01)
*F02D 41/40*    (2006.01)
(Continued)

(52) U.S. Cl.
CPC ........ *F02D 41/402* (2013.01); *F02B 23/0624* (2013.01); *F02B 23/0669* (2013.01);
(Continued)

(58) Field of Classification Search
CPC .. F02D 41/402; F02D 41/3827; F02D 41/221; F02D 35/023; F02D 35/025; F02D 2041/224; F02M 55/025; F02M 61/1806; F02M 61/1826; F02M 61/1846; F02M 2200/06; F02B 23/0624; F02B 23/0669; F02B 23/0672; Y02T 10/125; Y02T 10/40
(Continued)

(56) References Cited

FOREIGN PATENT DOCUMENTS

| EP | 3012432 A1 | 4/2016 |
| JP | 2011-185242 A | 9/2011 |
| WO | 2014/203381 A | 12/2014 |

*Primary Examiner* — Hai Huynh
(74) *Attorney, Agent, or Firm* — Sughrue Mion, PLLC (57) ABSTRACT

A control device for a compression-ignited internal combustion engine includes a nozzle that includes plural injection holes arranged at intervals in the circumferential direction and that directly injects fuel to a combustion chamber, a piston that includes a cavity with an inner circumferential side surface to which a distance from the nozzle varies in the circumferential direction, a first injection hole for injecting fuel to a portion of the inner circumferential side surface to which the distance from the nozzle is the largest out of the plural injection holes, a second injection hole for injecting fuel to a portion of the inner circumferential side surface to which the distance from the nozzle is the smallest out of the plural injection holes, a detection unit that detects a heat release rate in the combustion chamber, and a control unit that determines which of the first and second injection holes is abnormal.

10 Claims, 5 Drawing Sheets

(51) Int. Cl.
*F02B 23/06* (2006.01)
*F02D 35/02* (2006.01)
*F02D 41/38* (2006.01)
*F02M 55/02* (2006.01)

(52) U.S. Cl.
CPC ........ *F02B 23/0672* (2013.01); *F02D 35/023* (2013.01); *F02D 41/221* (2013.01); *F02D 41/3827* (2013.01); *F02M 55/025* (2013.01); *F02D 2041/224* (2013.01); *F02M 2200/06* (2013.01); *Y02T 10/125* (2013.01); *Y02T 10/40* (2013.01)

(58) Field of Classification Search
USPC ........ 123/299, 300, 435, 689, 672; 701/107, 701/111
See application file for complete search history.

CONTROL DEVICE FOR COMPRESSION-IGNITED INTERNAL COMBUSTION ENGINE

BACKGROUND OF THE INVENTION

1. Field of the Invention

The present invention relates to a control device for a compression-ignited internal combustion engine.

2. Description of Related Art

A piston is known in which a cavity having an inner circumferential side surface to which a distance from a nozzle varies depending on a position in the circumferential direction is formed. For example, in a piston disclosed in Japanese Patent Application Publication No. 2011-185242 (JP 2011-185242 A), an inner circumferential side surface of a cavity has a shape in which concave portions and convex portions are alternately arranged in the circumferential direction. Plural injection holes for injecting fuel to the concave portions and the convex portions are formed in the nozzle. The distance from the nozzle is small in the convex portions and is large in the concave portions. Accordingly, when fuel is injected from the injection holes of the nozzle, the fuel injected to the convex portions first collides with the convex portions and the fuel injected to the concave portions then collides with the concave portions.

SUMMARY OF THE INVENTION

When abnormality occurs in the injection holes of the nozzle of the internal combustion engine, a method of determining which of the injection hole for injecting fuel to a portion of the inner circumferential side surface close to the nozzle and the injection hole for injecting fuel to a portion of the inner circumferential side surface distant from the nozzle is abnormal is not known.

The present invention provides a control device for a compression-ignited internal combustion engine that includes a piston provided with a cavity having an inner circumferential side surface to which a distance from a nozzle varies depending on a position in the circumferential direction, and that the control device determines which of plural injection holes formed in a nozzle is abnormal.

According to a first aspect of the invention, there is provided a control device for a compression-ignited internal combustion engine, the compression-ignited internal combustion engine including a nozzle in which a plurality of injection holes are arranged at intervals in the circumferential direction of the nozzle, the plurality of injection holes including a first injection hole and a second injection hole, the nozzle being configured to directly inject fuel to a combustion chamber, and a piston provided with a cavity, the cavity being configured such that i) a distance from the first injection hole to the inner circumferential surface of the cavity is larger than a distance from any other injection hole to the inner circumferential surface of the cavity and ii) a distance from the second injection hole to the inner circumferential surface of the cavity is shorter than a distance from any other injection hole to the inner circumferential surface of the cavity, the control device including an electronic control unit configured to: detect a heat release rate in the combustion chamber; and to determine which of the first injection hole and the second injection hole is abnormal based on a magnitude of one relative to the other between a first-half determination value of the heat release rate and a second-half determination value of the heat release rate, the first-half determination value being a maximum value of the heat release rate after a fuel spray from the second injection hole in main injection is ignited and before a fuel spray from the first injection hole is ignited, the second-half determination value being a maximum value of the heat release rate after the fuel spray from the first injection hole is ignited.

According to a second aspect of the invention, there is provided a control device for a compression-ignited internal combustion engine, the compression-ignited internal combustion engine including a nozzle in which a plurality of injection holes are arranged at intervals in the circumferential direction of the nozzle, the plurality of injection holes including a first injection hole and a second injection hole, the nozzle being configured to directly inject fuel to a combustion chamber, and a piston provided with a cavity, the cavity being configured such that i) a distance from the first injection hole to the inner circumferential surface of the cavity is larger than a distance from any other injection hole to the inner circumferential surface of the cavity and ii) a distance from the second injection hole to the inner circumferential surface of the cavity is shorter than a distance from any other injection hole to the inner circumferential surface of the cavity, the control device including an electronic control unit configured to: detect a heat release rate in the combustion chamber; and to determine which of the first injection hole and the second injection hole is abnormal based on a magnitude of one relative to the other between a first-half determination value of the heat release rate and a second-half determination value of the heat release rate, the first-half determination value being a value of the heat release rate when a decreasing rate of the heat release rate is the largest after a fuel spray from the second injection hole in main injection is ignited and before a fuel spray from the first injection hole is ignited, the second-half determination value being a maximum value of the heat release rate after the fuel spray from the first injection hole is ignited.

The electronic control unit may be configured to determine that the first injection hole is abnormal when the magnitude of the first-half determination value relative to the second-half determination value is greater than a first predetermined value, and the electronic control unit may be configured to determine that the second injection hole is abnormal when the magnitude of the first-half determination value relative to the second-half determination value is less than a second predetermined value which is smaller than the first predetermined value.

The electronic control unit may be configured to determine that the second injection hole is abnormal when the magnitude of the second-half determination value relative to the first-half determination value is greater than a first predetermined value, and the electronic control unit may be configured to determine that the first injection hole is abnormal when the magnitude of the second-half determination value relative to the first-half determination value is less than a second predetermined value which is smaller than the first predetermined value.

The electronic control unit may be configured to perform a process of suppressing generation of smoke when it is determined that the first injection hole is abnormal.

The electronic control unit may be configured to perform a process of improving ignitionability of fuel when it is determined that the second injection hole is abnormal.

It is possible to provide a control device for a compression-ignited internal combustion engine that includes a piston provided with a cavity having an inner circumferential side surface to which a distance from a nozzle varies depending on a position in the circumferential direction and that determines which of plural injection holes formed in a nozzle is abnormal.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

Figure 1:
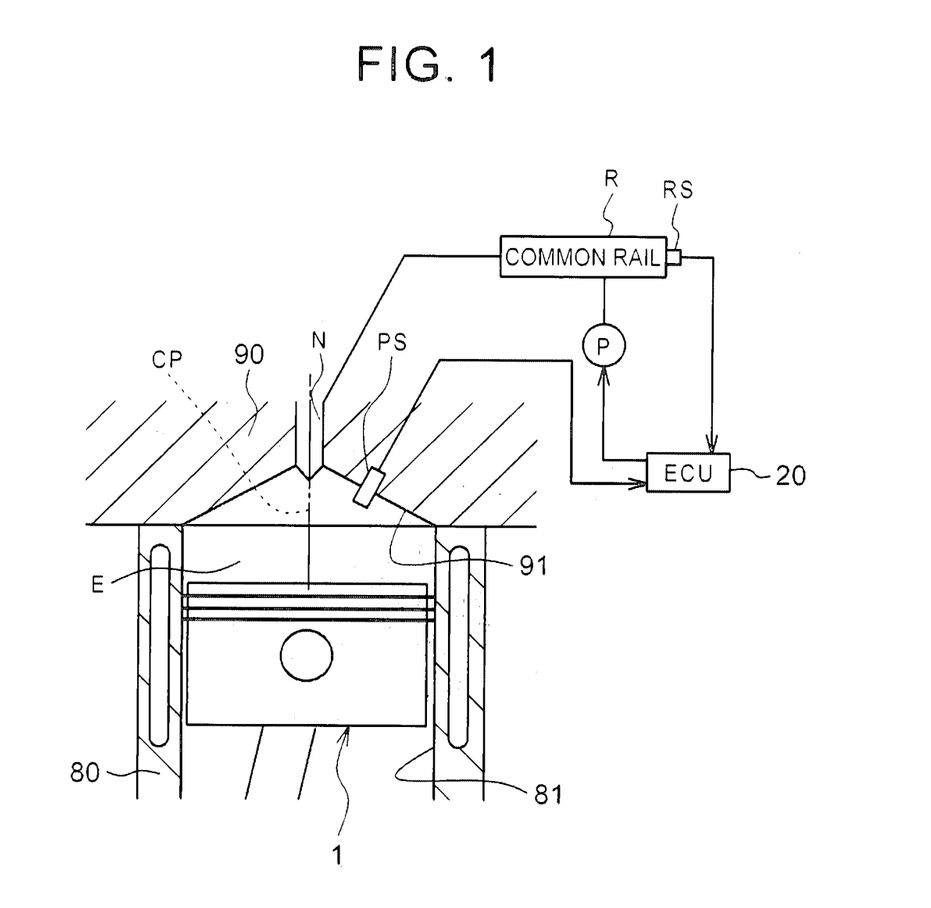
FIG. 1 is a diagram illustrating a compression-ignited internal combustion engine.

FIG. 1 is a diagram illustrating a compression-ignited internal combustion engine. The compression-ignited internal combustion engine is, for example, a diesel engine. A swirling flow is generated in a combustion chamber E. A cylinder 81 is formed in a cylinder block 80. A piston 1 is received in the cylinder 81. A cylinder head 90 is fixed to the top of the cylinder block 80.

The cylinder head 90, the cylinder block 80, and the piston 1 form the combustion chamber E. A portion 91 of the bottom wall of the cylinder head 90 forming the combustion chamber E has a pent roof shape but the invention is not limited to this shape.

The cylinder head 90 is provided with two intake ports and two exhaust ports which are not illustrated. The intake ports and the exhaust ports are opened and shut by intake valves and exhaust valves, respectively.

The cylinder head 90 is provided with a nozzle N that injects fuel. The nozzle N directly injects fuel to the combustion chamber E. The nozzle N is disposed in the central axis CP of the cylinder block 80. The nozzle N is connected to a common rail R via a pipe. The common rail R is supplied with fuel pressurized by a high-pressure pump P and the fuel is stored at a high pressure. By opening injection holes formed at the tip of the nozzle N through the use of a valve body, fuel is injected from the injection holes. A fuel pressure sensor RS that detects a fuel pressure in the common rail 30 is attached to the common rail 30.

An electronic control unit (ECU) 20 controls the entire engine. The ECU 20 is a computer including a read only memory (ROM), a random access memory (RAM), and a central processing unit (CPU), which are not illustrated. The ECU 20 controls the high-pressure pump P on the basis of an output value from the fuel pressure sensor RS so as to control the fuel pressure in the common rail R.

A pressure sensor PS that detects the pressure in the combustion chamber E is attached to the cylinder head 90. The ECU 20 calculates a heat release rate in the combustion chamber E on the basis of an output value from the pressure sensor PS. For example, the heat release rate is calculated using the following method. A heat release rate $dQ/d\theta$ at a certain crank angle $\theta$ can be expressed by Expression (1). That is, the heat release rate $dQ/d\theta$ at a certain crank angle $\theta$ can be calculated on the basis of a relationship between an in-cylinder pressure P and an in-cylinder volume V.

$$dQ/d\theta = \{\kappa/(\kappa-1)\} \times P(dV/d\theta) + \{1/(\kappa-1)\} \times V(dP/d\theta) \quad (1)$$

In Expression (1), $\kappa$ is a specific heat ratio and is, for example, about 1.4. The specific heat ratio $\kappa$ can be obtained by dividing a constant-pressure specific heat Cp by a constant-volume specific heat Cv. In Expression (1), P is the in-cylinder pressure, V is the in-cylinder volume, and $\theta$ is the crank angle. The pressure sensor PS is an example of the detection unit that detects the heat release rate in the combustion chamber E. The ECU 20 is an example of the control unit that performs the abnormality determination control to be described later on the basis of the heat release rate in the combustion chamber E.

Figures 2A, 2B, 2C:
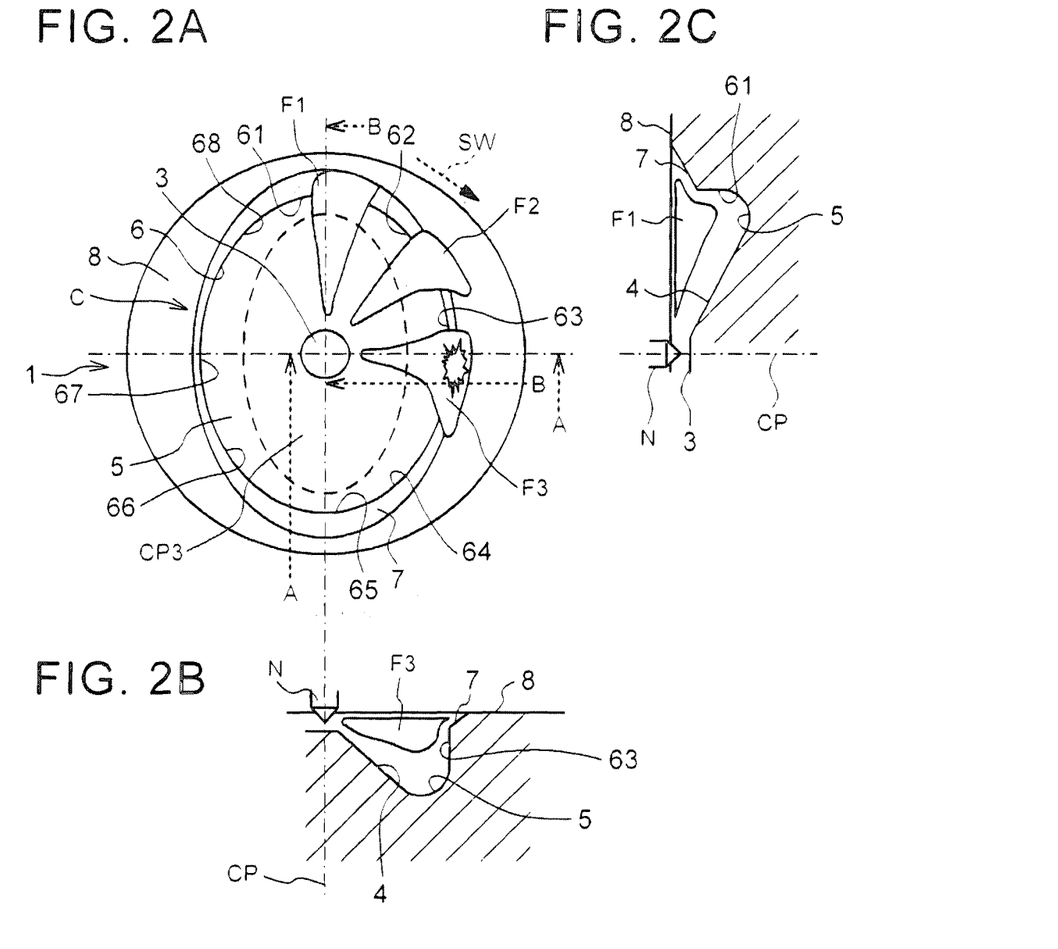
FIG. 2A is a top view of a piston.
FIG. 2B is a cross-sectional view taken along line A-A of FIG. 2A.
FIG. 2C is a cross-sectional view taken along line B-B of FIG. 2A.
Figure 3:
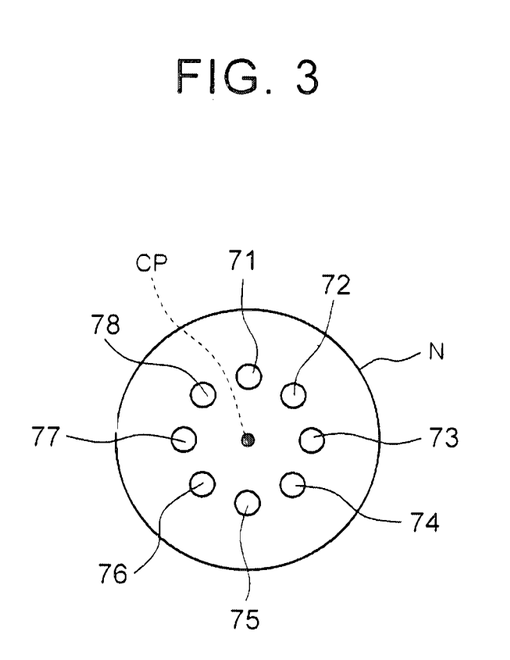
FIG. 3 is a diagram illustrating a tip of a nozzle when viewed from the bottom side.

FIG. 2A is a top view of the piston 1. FIG. 2B is a cross-sectional view taken along line A-A of FIG. 2A. FIG. 2C is a cross-sectional view taken along line B-B of FIG. 2A. FIG. 3 is a diagram illustrating a tip of a nozzle N when viewed from the bottom side. A cavity C to which fuel is injected is formed on the top of the piston 1. A swirling flow SW flows in the clockwise direction.

The cavity C is formed in a concave shape on the top surface 8 of the piston 1 and has a substantially elliptical shape when viewed from the top side. The cavity C includes an elevated surface 3 that is located at the center thereof, elevated upward, and flat, an inclined bottom surface 4 that is formed around the elevated surface 3, a curved surface 5 that is curved upward from the inclined bottom surface 4, and an inner circumferential side surface 6 that extends upward from the curved surface 5. The inclined bottom surface 4 is inclined and extends downward along the outside in the radius direction from the elevated surface 3, and extends in a straight shape in a cross-sectional view. The curved surface 5 is curved inward from the inclined bottom surface 4 and is formed around the inclined bottom surface 4. The inner circumferential side surface 6 is formed around the curved surface 5. The distance from the nozzle N to the inner circumferential side surface 6 in the radius direction of the nozzle N varies in the circumferential direction. Details thereof will be described later.

An inclined top surface 7 that is inclined outward in the radius direction and that extends upward is formed around the outside in the radius direction of the inner circumferential side surface 6. A top surface 8 that is flat is formed around the outside in the radius direction of the inclined top surface 7. In FIG. 2A, the boundary between the inclined bottom surface 4 and the curved surface 5 is indicated by a dotted line. When the piston 1 is located at the top dead center, the tip of the nozzle N faces the elevated surface 3 as illustrated in FIGS. 2B, 2C.

As illustrated in FIG. 2A, the cavity C has a substantially elliptical shape when viewed from the top side. The inner circumferential side surface 6 includes zones 61 to 68 that are arranged at equal intervals in the clockwise direction around the central axis CP. The zones 61, 65 face each other with the central axis CP interposed therebetween, and the zones 62, 66, the zones 63, 67, and the zones 64, 68 similarly face each other with the central axis CP interposed therebetween, respectively. The distance between the zones 61, 65 in the horizontal direction perpendicular to the central axis CP is greater than the distance between the zones 62, 66, the distance between the zones 63, 67, and the distance between the zones 64, 68. The distance between the zones 63, 67 in the horizontal direction is smaller than the distance between the zones 61, 65, the distance between the zones 62, 66, and the distance between the zones 64, 68. The distance between the zones 61, 65 corresponds to the long diameter of an ellipse and the distance between the zones 63, 67 corresponds to the short diameter of the ellipse. That is, the zones 61, 65 correspond to the portions of the inner circumferential side surface 6 to which the distance from the nozzle N is the largest. The zones 63, 67 correspond to the portions of the inner circumferential side surface 6 to which the distance from the nozzle N is the smallest. The distance between the zones 62, 66 and the distance between the zones 64, 68 are equal to each other. The shape of the inner circumferential side surface 6 is point-symmetric with respect to the central axis CP when viewed from the top side. Out of the zones 61 to 68, the zones 61, 65 are most distant from the nozzle N and the zones 63, 67 are closest to the nozzle N.

As illustrated in FIG. 3, plural injection holes 71 to 78 arranged at intervals in the circumferential direction are formed on the tip of the nozzle N. The tip of the nozzle N has a tapered shape and the plural injection holes 71 to 78 are formed on the outer circumferential surface of the tapered shape. When the piston 1 is located at the top dead center, the injection holes 71 to 78 of the nozzle N face the zones 61 to 68 of the inner circumferential side surface 6, respectively. The injection holes 71, 75 are an example of the first injection hole that injects fuel to the portion of the inner circumferential side surface 6 of which the distance from the nozzle N is the largest out of the plural injection holes 71 to 78. The injection holes 73, 77 are an example of the second injection hole that injects fuel to the portion of the inner circumferential side surface 6 of which the distance from the nozzle N is the smallest out of the plural injection holes 71 to 78. When fuel is injected from all the injection holes 71 to 78, fuel sprays from the injection holes 73, 77 collide earliest with the inner circumferential side surface 6, and fuel sprays from the injection holes 71, 75 collide last with the inner circumferential side surface 6.

In FIGS. 2A to 2C, the fuel sprays F1 to F3 injected from the injection holes 71 to 73 of the nozzle N are illustrated. In FIGS. 2A to 2C, the fuel sprays injected from the injection holes 74 to 78 are not illustrated.

Combustion of fuel will be described below. When fuel is injected from the nozzle N, fuel is injected from all the injection holes 71 to 78 at substantially the same time. First, the fuel sprays first collide with the zones 63, 67. Then, the fuel sprays collide with the zones 62, 64, 66, and 68. Finally, the fuel sprays collide with the zones 61, 65. In the examples illustrated in FIGS. 2A to 2C, the fuel sprays F3, F2, and F1 collide with the zones 63, 62, and 61, respectively, in this order. When the fuel sprays collide with a certain zone of the inner circumferential side surface 6, the fuel sprays and air are mixed and ignited. Accordingly, the fuel spray F3 is first ignited, the fuel spray F2 is then ignited, and the fuel spray F1 is finally ignited.

Accordingly, it is possible to guarantee a combustion rate (combustion speed) difference between the fuel sprays. Accordingly, compared with a case in which plural fuel sprays are ignited at substantially the same time and the combustion rate (combustion speed) difference is small, it is possible to suppress peak values of an amount of heat and to suppress the combustion temperature. Accordingly, it is possible to reduce an amount of NOx and to suppress combustion noise. In this way, the performance of the internal combustion engine according to this embodiment is improved.

Figure 4A:
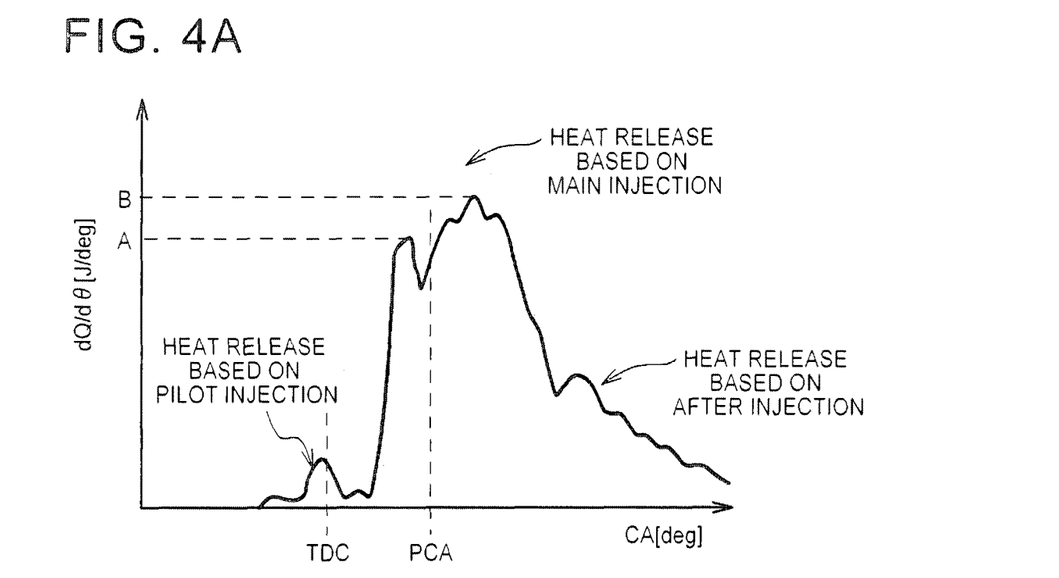
FIGS. 4A and 4B are graphs illustrating a heat release rate.
Figure 4B:
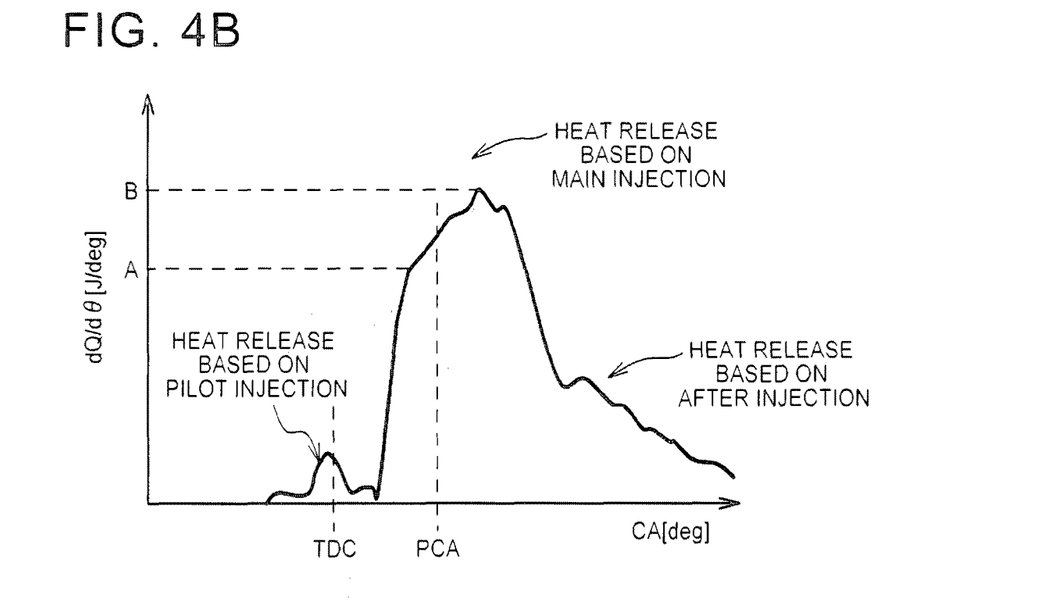

FIGS. 4A and 4B are graphs illustrating the heat release rate. The vertical axis represents the heat release rate and the horizontal axis represents the crank angle. FIG. 4A illustrates an example of the heat release rate at the time of operation with a light load or a middle load and FIG. 4B illustrates an example of the heat release rate at the time of operation with a high load. In this embodiment, pilot injection, main injection, and after injection are performed in one combustion cycle. The fuel is combusted based on the injections and the heat release rate in the combustion chamber. E varies. The increase in the heat release rate based on the pilot injection occurs when the piston 1 is located in the vicinity of the top dead center. The increase in the heat release rate based on the main injection occurs mainly in an expansion stroke. The main injection is fuel injection for generating a torque of the engine and an amount of fuel injected is determined depending on the load of the engine (specifically, a throttle opening or a pressure applied to an accelerator pedal).

In the heat release rate based on the main injection at the time of operation with a light load or a middle load, as illustrated in FIG. 4A, a first-half maximum value and a second-half maximum value are present before and after a predetermined crank angle PCA. It is thought that the first-half maximum value is based on ignition and combustion of the fuel spray injected to the zones 63, 67 close to the nozzle N. It is thought that the second-half maximum value is based on the ignition and combustion of all the fuel sprays. Here, the first-half maximum value is also a local maximum value at which the slope of the heat release rate is zero. The first-half maximum value and the second-half maximum value correspond to the first-half determination value A and the second-half determination value B (hereinafter, referred to as determination values) used for the abnormal determination control of the injection holes of which details will be described later.

In the heat release rate based on the main injection at the time of operation with a high load, as illustrated in FIG. 4B, a value of the heat release rate when the decreasing rate is the highest before the predetermined crank angle PCA and after the increase of the heat release rate is started based on the main injection is present in addition to the second-half determination value B. It is thought that since the temperature in the combustion chamber E is high at the time of operation with a high load, the injected fuel sprays are early self-ignited. Here, the time when the decreasing rate of the heat release rate is the highest means the time at which the slope of the heat release rate is the greatest. The value of the heat release rate when the decreasing rate of the heat release rate is the highest before the predetermined crank angle PCA and after the increase of the heat release rate is started based on the main injection corresponds to the first-half determination value A (hereinafter, referred to as determination value).

Here, the predetermined crank angle PCA is a crank angle after a fuel spray is first ignited and before a fuel spray is finally ignited out of fuel sprays injected in the main injection in a normal combustion state. As described above, in the normal combustion state, the fuel sprays injected from the injection holes 73, 77 to the zones 63, 67 in the main injection are first ignited. The fuel sprays injected from the injection holes 71, 75 to the zones 61, 65 are finally ignited. Accordingly, the determination value A is based on the fuel spray F3 which is first ignited in the main injection and the determination value B is based on the ignition of all the fuel sprays in the main injection. The predetermined crank angle PCA is set on the basis of the results obtained in advance by experimentation or the like.

For example, deposits and the like may be attached to the injection holes of the nozzle N and abnormality may occur in the shapes of the fuel sprays or the amount of fuel injected may be less than a desired amount of fuel. The ECU 20 determines which injection hole is abnormal and performs appropriate control on the basis of the determination result. The abnormality determination control that is performed by the ECU 20 will be described below.

Figure 5:
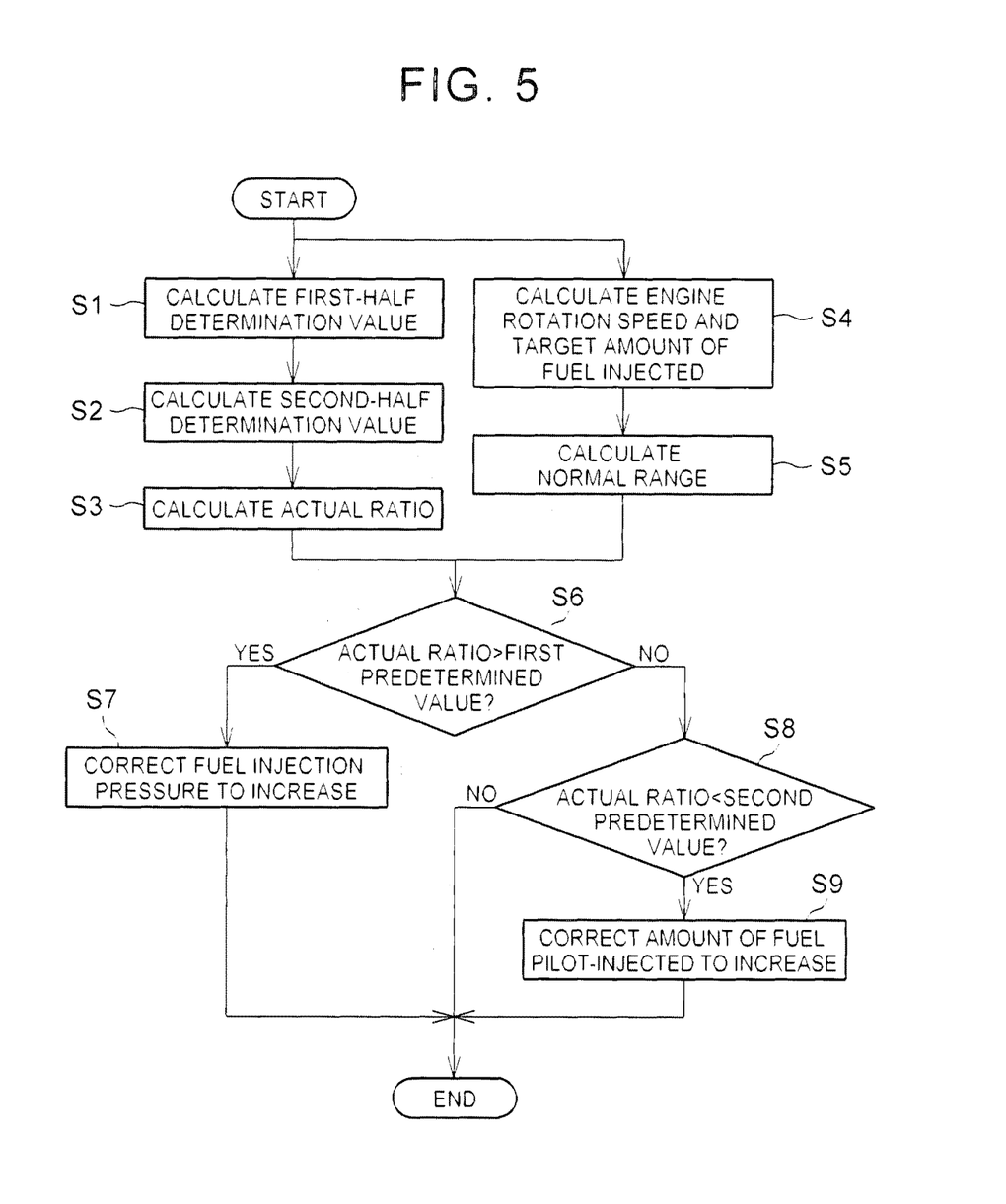
FIG. 5 is a flowchart illustrating an example of abnormality determination control that is performed by an ECU.

FIG. 5 is a flowchart illustrating an example of the abnormality determination control that is performed by the ECU 20. The ECU 20 calculates the determination value A and the determination value B of the heat release rate based on the main injection on the basis of the in-cylinder pressure acquired from the pressure sensor PS and Expression (1) (steps S1, S2).

Then, the ECU 20 calculates an actual ratio of the determination value A to the determination value B (hereinafter, referred to as actual ratio), that is, a value obtained by dividing the determination value A by the determination value B (step S3). The magnitude of the actual ratio means the magnitude of one relative to the other out of the determination values A, B.

Then, the ECU 20 calculates an engine rotation speed and a target amount of fuel injected (step S4). The engine rotation speed is calculated on the basis of the output of the crank angle sensor and the target amount of fuel injected is calculated on the basis of the engine rotation speed and the accelerator opening, but other known methods may be used. Then, the ECU 20 calculates a normal range (a first predetermined value and a second predetermined value which is smaller than the first predetermined value) on the basis of the calculated target amount of fuel injected (step S5). The normal range is a range of the ratio of the determination value A to the determination value B when fuel is normally injected and combusted by the calculated target amount of fuel injected. The normal range is calculated on the basis of a map that is prepared in advance on the basis of the result obtained by experimentation or the like and stored in advance in the ROM or the like of the ECU 20 and that is correlated with at least the target amount of fuel injected. Here, the normal range is an example of the predetermined range. The order of steps S3, S5 may be interchanged.

The ECU 20 determines whether the calculated actual ratio is greater than the first predetermined value (step S6). Here, the case in which the actual ratio is large means a case in which the magnitude of the determination value A relative to the determination value B is large, that is, a case in which the magnitude of the determination value B relative to the determination value A is small. The case in which the actual ratio increases includes a case in which the determination value B does not vary and the determination value A becomes greater than a normal value and a case in which the determination value A does not vary and the determination value B becomes smaller than a normal value. However, the case in which the determination value A becomes greater than the normal value means that the amount of fuel sprays which are injected from the injection holes 73, 77 and which are early ignited increases, and it is difficult to suppose that this case occurs. When failure of an actuator in the nozzle N or the like occurs, the amounts of fuel injected from the other injection holes as well as the injection holes 73, 77 uniformly increase. Accordingly, since the determination value B becomes smaller than the normal value, it is thought that the actual ratio becomes greater than the first predetermined value. In this case, it is thought that certain abnormality occurs in at least one of the injection holes 71, 75 and the amount of fuel sprays from the injection holes 71, 75 decreases or the penetration thereof is lowered. In this case, adjacent fuel sprays may interfere with each other to cause smoke to degrade.

Therefore, the ECU 20 controls the high-pressure pump P so as to increase the fuel pressure in the common rail R as a process of suppressing the degradation in smoke (step S7). Accordingly, it is possible to suppress the decrease in penetration of the fuel sprays from the injection holes 71, 75 and to suppress the degradation in smoke. As a result, it is possible to suppress destruction of a diesel particulate capturing filter based on the degradation in smoke.

When the determination result of step S6 is negative, the ECU 20 determines whether the actual ratio is less than the second predetermined value (step S8). Here, the case in which the actual ratio is small means a case in which the magnitude of the determination value A relative to the determination value B is small, that is, a case in which the magnitude of the determination value B relative to the determination value A is large. The case in which the actual ratio decreases includes a case in which the determination value B does not vary and the determination value A becomes less than a normal value and a case in which the determination value A does not vary and the determination value B becomes greater than the normal value. However, the case in which the determination value B becomes greater than the normal value means that the amount of fuel sprays which are injected from the injection holes 71, 75 and which are late ignited increases, and it is difficult to suppose that this case occurs. Accordingly, since the determination value A becomes smaller than the normal value, it is thought that the actual ratio becomes less than the second predetermined value. In this case, it is thought that certain abnormality such as deposits occurs in at least one of the injection holes 73, 77 and the amount of fuel sprays from the injection holes 73, 77 decreases or the penetration thereof is lowered. In this case, the ignitionability of the fuel sprays which have been early ignited in an original case may degrade. Accordingly, a misfire may occur, for example, at the time of operation with a light load.

Therefore, the ECU 20 corrects the amount of fuel injected in the pilot injection to increase as a process of improving the ignitionability of fuel (step S9). Accordingly, the heat release rate in preliminary combustion which is preliminary combustion prior to the main combustion is improved and it is thus possible to suppress the misfire. The smoke may degrade by increasing the amount of fuel injected in the pilot injection, but the misfire of the engine is suppressed prior to generation of smoke.

When the determination result of step S8 is negative, the ECU 20 ends this control. In this way, the ECU 20 determines whether the combustion state is normal or abnormal on the basis of the determination values A, B, and determines which of the injection holes 71, 75 side and the injection holes 73, 77 side is abnormal when it is determined that the combustion state is abnormal. The ECU 20 can determine which of the control of suppressing a misfire and the control of suppressing a degradation in smoke to perform on the basis of the determination result. Here, the order of steps S6, S8 may be interchanged.

In the above-mentioned embodiment, the upper limit and the lower limit of the normal range correspond to different predetermined reference values for determining which of the injection holes 71, 75 side and the injection holes 73, 77 side is abnormal.

As illustrated in FIGS. 4A, 4B, the determination value A may be set to a value that is a maximum value and is also a local maximum value of the heat release rate appearing before the predetermined crank angle PCA and a value of the heat release rate when the decreasing rate of the heat release rate is a maximum. The ECU 20 determines whether the value that is a maximum value and is also a local maximum value of the heat release rate is present in a period after the main injection is performed and before the predetermined crank angle PCA. When the value that is a maximum value and also a local maximum value of the heat release rate is present, this value is used as the determination value A. When the value that is a maximum value and is also a maximum of the heat release rate is not present, the ECU 20 uses the value of the heat release rate when the decreasing rate of the heat release rate is a maximum as the determination value A.

In this embodiment, the abnormality determination control is performed on the basis of the ratio of the determination value A to the determination value B, but the invention is not limited to this configuration. For example, the abnormal determination control may be performed on the basis of the actual ratio of the determination value B to the determination value A. This is because the ratio of the determination value B to the determination value A also indicates the magnitude of one to the other out of the determination values A, B. In this case, a range of the ratio of the determination value B to the determination value A at the time of normal combustion is calculated as the normal range. The process of step S7 is performed when the actual ratio is less than the lower limit, and the process of step S9 is performed when the actual ratio is greater than the lower limit.

The abnormality determination control may be performed on the basis of a value obtained by subtracting one of the determination values A, B from the other. This is because the value obtained by subtracting one of the determination values A, B from the other also indicates the magnitude of one to the other out of the determination values A, B. In this case, a range of the value obtained by subtracting one of the determination values A, B from the other at the time of normal combustion is calculated as the normal range. The abnormal injection hole is determined depending on whether the determination value obtained by subtracting one of the determination values A, B from the other is actually greater than the upper limit or less than the lower limit, and the process of step S7 or S9 is performed.

In this embodiment, by correcting at least one of an injection pressure of fuel injection, an amount of fuel injected, and an injection timing on the basis of the determination values. A, B, one of the process of improving the ignitionability of fuel and the process of suppressing the degradation in smoke is performed or not performed.

Here, a process other than step S7 may be performed as the process of suppressing the degradation in smoke. A process of controlling an EGR valve so as to decrease an EGR volume and to increase an amount of oxygen introduced into the combustion chamber E may be performed. A process of increasing an amount of oxygen introduced into the combustion chamber E by controlling the opening of a waste gate valve to increase a supercharging pressure may be performed. A process of controlling the opening of a swirl control valve so as to increase a swirling flow in a cylinder may be performed. A control of reducing an amount of fuel injected in pilot injection or the number of times of pilot injection may be performed. A process of delaying a start time of fuel injection in one combustion cycle may be performed. The process of suppressing the degradation in smoke may be another known process.

A process other than step S9 may be performed as the process of improving the ignitionability of fuel. For example, a process of advancing the injection timing of the main injection or the start time of fuel injection in one combustion cycle may be performed. A correction process of decreasing the EGR volume by controlling the opening of the EGR valve so as to decrease the opening may be performed. A control of increasing the pressure of a compression end by controlling the opening of the waste gate valve so as to increase the supercharging pressure may be performed. A process of controlling the opening of the swirl control valve so as to decrease the swirling flow in the cylinder may be performed. A process of increasing the number of times of pilot injection may be performed. A process of decreasing a fuel pressure in the common rail R may be performed. A process of temporarily supplying power to a glow plug may be performed. The process of improving the ignitionability of fuel may be another known process.

While the embodiment of the invention has been described above in detail, the invention is not limited to the specific embodiment and may be modified in various forms without departing from the gist of the invention described in the appended claims.

The number of injection holes of the nozzle is not limited to the number described in the above-mentioned embodiment. The number of injection holes of the nozzle only has to be at least two. The shape of the cavity is not limited to the elliptical shape as described above. The shape of the cavity may be a complete circular shape when viewed from the top side and the nozzle may be located at a position spaced apart from the central axis of the cavity. Even when the nozzle is located at a position spaced apart from the central axis of the cavity in this way, the distance from the nozzle to the inner circumferential side surface of the cavity in the radius direction of the nozzle varies in the circumferential direction.

In the above-mentioned embodiment, the value that is a maximum value and a local maximum value of the heat release rate as illustrated in FIG. 4A or the value of the heat release rate when the decreasing rate of the heat release rate is a maximum as illustrated in FIG. 4B is calculated as the determination value A, in consideration of the variation in the heat release rate varying depending on the load of the internal combustion engine. However, depending on the conditions such as the size of the internal combustion engine, the shape of the cavity, and the allowable operation area of the internal combustion engine, it may be considered that the variation in the heat release rate in the normal combustion state is the same as only one of FIGS. 4A, 4B. Accordingly, the abnormality determination control may be performed using only the value of the heat release rate when the decreasing rate of the heat release rate is the maximum as the determination value A as illustrated in FIG. 4B. The abnormality determination result may be performed using only the maximum value as the determination value A as illustrated in FIG. 4A. In this case, the determination value A only has to be a maximum value and does not need to be a local maximum value.

The invention claimed is:
1. A control device for a compression-ignited internal combustion engine, the compression-ignited internal combustion engine including
a nozzle in which a plurality of injection holes are arranged at intervals in a circumferential direction of the nozzle, the plurality of injection holes including a first injection hole and a second injection hole, the nozzle being configured to directly inject fuel to a combustion chamber, and a piston provided with a cavity, the cavity being configured such that i) a distance from the first injection hole to an inner circumferential surface of the cavity is larger than a distance from any other injection hole to the inner circumferential surface of the cavity and ii) a distance from the second injection hole to the inner circumferential surface of the cavity is shorter than a distance from any other injection hole to the inner circumferential surface of the cavity, the control device comprising:

an electronic control unit configured to:
- a) detect a heat release rate in the combustion chamber; and
- b) determine which of the first injection hole and the second injection hole is abnormal based on a magnitude of one relative to the other between a first-half determination value of the heat release rate and a second-half determination value of the heat release rate, the first-half determination value being a maximum value of the heat release rate after a fuel spray from the second injection hole in main injection is ignited and before a fuel spray from the first injection hole is ignited, the second-half determination value being a maximum value of the heat release rate after the fuel spray from the first injection hole is ignited.

2. The control device according to claim 1, wherein the electronic control unit is configured to determine that the first injection hole is abnormal when the magnitude of the first-half determination value relative to the second-half determination value is greater than a first predetermined value, and
   wherein the electronic control unit is configured to determine that the second injection hole is abnormal when the magnitude of the first-half determination value relative to the second-half determination value is less than a second predetermined value which is smaller than the first predetermined value.

3. The control device according to claim 1, wherein the electronic control unit is configured to determine that the second injection hole is abnormal when the magnitude of the second-half determination value relative to the first-half determination value is greater than a first predetermined value, and
   wherein the electronic control unit is configured to determine that the first injection hole is abnormal when the magnitude of the second-half determination value relative to the first-half determination value is less than a second predetermined value which is smaller than the first predetermined value.

4. The control device according to claim 1, wherein the electronic control unit is configured to perform a process of suppressing generation of smoke when the electronic control unit determines that the first injection hole is abnormal.

5. The control device according to claim 1, wherein the electronic control unit is configured to perform a process of improving ignitionability of fuel when the electronic control unit determines that the second injection hole is abnormal.

6. A control device for a compression-ignited internal combustion engine, the compression-ignited internal combustion engine including a nozzle in which a plurality of injection holes are arranged at intervals in a circumferential direction of the nozzle, the plurality of injection holes including a first injection hole and a second injection hole, the nozzle being configured to directly inject fuel to a combustion chamber, and a piston provided with a cavity, the cavity being configured such that i) a distance from the first injection hole to an inner circumferential surface of the cavity is larger than a distance from any other injection hole to the inner circumferential surface of the cavity and ii) a distance from the second injection hole to the inner circumferential surface of the cavity is shorter than a distance from any other injection hole to the inner circumferential surface of the cavity, the control device comprising:

an electronic control unit configured to:
- a) detect a heat release rate in the combustion chamber; and
- b) determine which of the first injection hole and the second injection hole is abnormal based on a magnitude of one relative to the other between a first-half determination value of the heat release rate and a second-half determination value of the heat release rate, the first-half determination value being a value of the heat release rate when a decreasing rate of the heat release rate is the largest after a fuel spray from the second injection hole in main injection is ignited and before a fuel spray from the first injection hole is ignited, the second-half determination value being a maximum value of the heat release rate after the fuel spray from the first injection hole is ignited.

7. The control device according to claim 6, wherein the electronic control unit is configured to determine that the first injection hole is abnormal when the magnitude of the first-half determination value relative to the second-half determination value is greater than a first predetermined value, and
   wherein the electronic control unit is configured to determine that the second injection hole is abnormal when the magnitude of the first-half determination value relative to the second-half determination value is less than a second predetermined value which is smaller than the first predetermined value.

8. The control device according to claim 6, wherein the electronic control unit is configured to determine that the second injection hole is abnormal when the magnitude of the second-half determination value relative to the first-half determination value is greater than a first predetermined value, and
   wherein the electronic control unit is configured to determine that the first injection hole is abnormal when the magnitude of the second-half determination value relative to the first-half determination value is less than a second predetermined value which is smaller than the first predetermined value.

9. The control device according to claim 6, wherein the electronic control unit is configured to perform a process of suppressing generation of smoke when the electronic control unit determines that the first injection hole is abnormal.

10. The control device according to claim 6, wherein the electronic control unit is configured to perform a process of improving ignitionability of fuel when the electronic control unit determines that the second injection hole is abnormal.

* * * * *